(12) United States Patent
Smith (10) Patent No.: US 6,245,981 B1
(45) Date of Patent: Jun. 12, 2001

(54) MUSICAL KEY TRANSPOSER

(76) Inventor: Jonathan R. Smith, 714 Plantation Cir., Brunswick, GA (US) 31525

( * ) Notice: Subject to any disclaimer, the term of this patent is extended or adjusted under 35 U.S.C. 154(b) by 0 days.

(21) Appl. No.: 09/536,359

(22) Filed: Mar. 27, 2000

Related U.S. Application Data (60) Provisional application No. 60/126,538, filed on Mar. 26, 1999.

(51) Int. Cl.[7] .................................................. G09B 15/02
(52) U.S. Cl. ............................................... 84/474; 84/456
(58) Field of Search ................................. 84/456, 470 R, 84/471 R, 474

(56) References Cited

U.S. PATENT DOCUMENTS

| | | |
|---|---|---|
| D. 334,765 | 4/1993 | Dunn, Jr. . |
| D. 356,330 | 3/1995 | Henriquez . |
| 1,796,795 * | 3/1931 | Kratt . |
| 2,726,568 * | 12/1955 | Lake . |
| 2,837,954 * | 6/1958 | Kratt . |
| 4,037,518 | 7/1977 | Garcia Lorenzen . |
| 4,074,607 | 2/1978 | Bond . |
| 4,716,806 | 1/1988 | Forrest . |
| 5,173,566 | 12/1992 | Hiraoka . |
| 5,288,234 | 2/1994 | Hamzi . |
| 5,320,020 | 6/1994 | Corley . |
| 5,791,505 | 8/1998 | Gilliland . |
| 6,031,172 * | 2/2000 | Papadopoulos .................. 84/470 R |

* cited by examiner

Primary Examiner—Jeffrey Donels (57) ABSTRACT

A circular slide attachment with pitch notations and additional markings is provided to enable circular pitch instruments and their indicia to be used for transposing musical keys. In the preferred embodiment of the invention, a circular slide having twelve chromatic scale note indicia is rotatably and coaxially fixed to a thirteen-tone pitch instrument bearing thirteen note indicia. Additional markings affixed to the pitch instrument cooperate with markings on the slide to enable transposition of the notes represented by one set of indicia to the notes represented by the other.

9 Claims, 8 Drawing Sheets

MUSICAL KEY TRANSPOSER

This non-provisional application for patent claims the benefit of the earlier-filed provisional patent application No. 60/126,538 filed Mar 26, 1999.

BACKGROUND OF THE INVENTION

The present invention relates generally to the field of music, more specifically to playing or tuning musical instruments or singing music, and more specifically still to changing (i.e. transposing) musical scores or instrument tunings from one key to another.

Transposing a musical score involves shifting all the notes in the score up or down one or more half steps on the twelve-tone chromatic scale. This is done most often to allow a singer to sing a song that was not written in his or her vocal range. It is also often done to allow a musician to play a song in a key in which he or she is more proficient on a particular musical instrument, or to play an instrument in which the musical tone designated "A" does not correspond to the standard "A" frequency of 440 Hz. Transposing can be done mentally by counting up or down from each note a given number of half-steps, by mechanical slide rules that shift two chromatic scales opposite one another, or by electronic or digital devices in which one key is the input and the transposed values are the output. The present invention is of the mechanical slide variety of transposers.

In a twelve-tone circular reed pitch instrument, each of the twelve tones of the chromatic scale from middle C upward through B can be played by blowing air through any of twelve openings on the periphery of a circular array. In a thirteen-tone reed pitch instrument, an additional high C note is added after B as a convenience. These pitch instruments typically take the form of a small wheel held together by a screw through an axial hole.

The note values on a circular pitch instrument are typically printed or embossed as indicia on one face of the wheel next to each peripheral opening at some arbitrary radius from the center.

SUMMARY OF THE INVENTION

This provisional patent application discloses a circular slide rule transposer in combination with a circular (chromatic) pitch instrument. A circular slide having a radius less than the radius R of the indicia on the face of the pitch instrument, and bearing twelve evenly-spaced indicia of its own inside its periphery, is affixed concentrically to a twelve- or thirteen-tone pitch instrument in which the twelve or thirteen air openings and their indicia are also evenly spaced. Combined with a twelve-tone pitch instrument, the slide can be rotated coaxially by hand relative to the wheel so that each indicium on the slide adjoins a corresponding indicium the on the wheel. If a note X on the slide is placed adjacent to a note Y on the wheel, any other note on the slide will be adjacent its transpose on the wheel. Thus, for example, in transposing a piece in the key of G to the key of B-flat, A transposes to C, D transposes to F, etc. It is therefore an object of this invention to provide a means, in conjunction with a twelve-tone circular pitch instrument, for mechanically transposing notes and keys, and add this means to said pitch instrument with minimal encumbrance and added expense.

If a thirteen-tone pitch instrument is used as the wheel, the markings on the pitch instrument itself must be modified in accordance with the present invention to allow it to cooperate with the aforementioned twelve indicia slide in transposing keys. It is therefore a further object of this invention to provide a means, in conjunction with a thirteen-tone circular pitch instrument, for mechanically transposing notes and keys, and add this means to said pitch instrument with minimal encumbrance and added expense.

The principal invention herein described, therefore, comprises the slide and its indicia and markings, and other markings needed to be applied to the pitch instrument, which markings in cooperating with each other enable musical keys to be transposed.

DETAILED DESCRIPTION OF THE INVENTION

Figure 1:
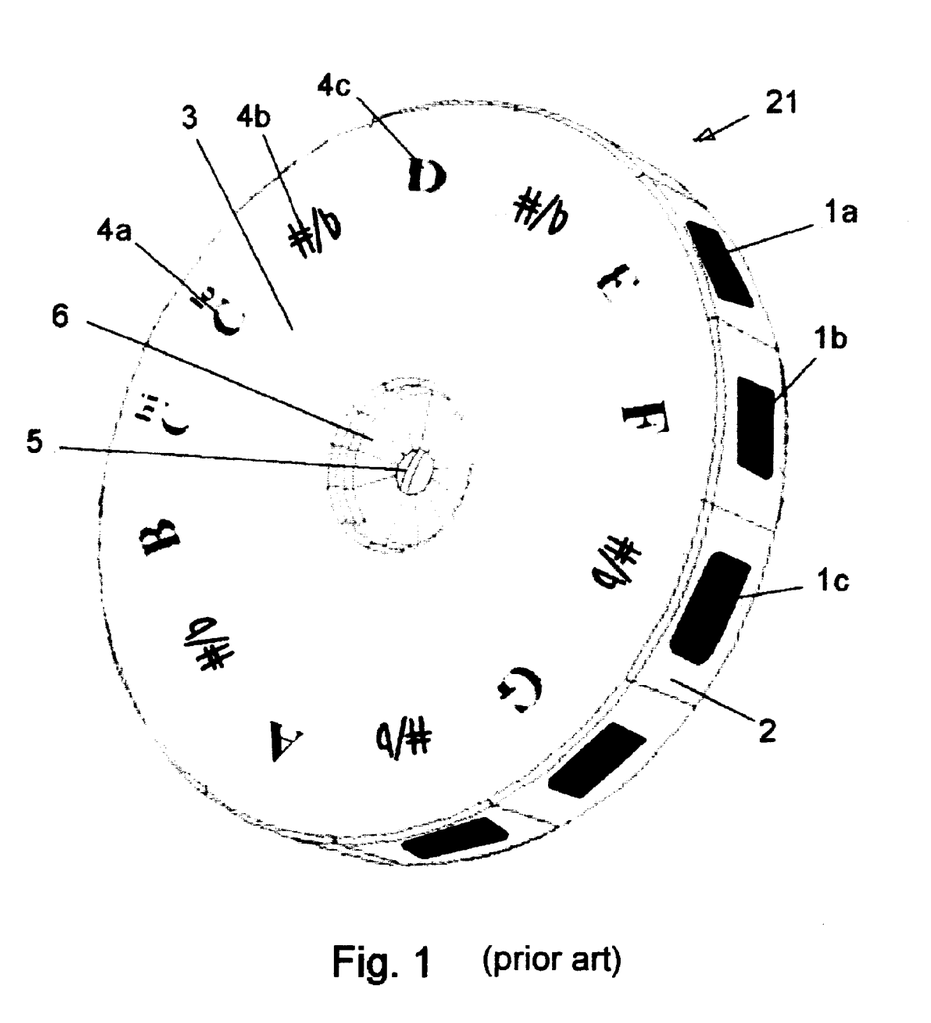
FIG. 1 is a perspective view of a typical thirteen-tone circular pitch instrument.

Referring now in greater detail to the drawings, in which like numerals represent like components throughout the several views, FIG. 1 is a perspective view of a typical thirteen-tone circular pitch instrument 21, known in the art. It consists of thirteen tone-producing elements (not shown) corresponding to thirteen air openings 1a, 1b, 1c, etc. around the periphery of a rigid, usually metal or plastic, wheel 2. On one face 3 of the wheel 2, thirteen musical note indicia 4a, 4b, 4c etc. are affixed near the thirteen openings la, etc., indicating the tone produced by air blown by mouth through a particular opening. In the pitch instrument shown, the tones begin with middle C, progress clockwise to C#, D, Eb, E, F, F#, G, Ab, A, Bb, B, and end at C one octave above the first C. (Alternatively, of course, a pitch instrument may be constructed so that the progression begins with a different pitch, or so that the progression is counterclockwise (not shown) or even so that the progression is random (also not shown).) A screw 5 is shown at the center of the wheel 2 passing through a central hole (not shown). This screw 5 in combination with a nut on the opposite side (not shown) holds the pitch instrument 21 together. For proper function of the pitch instrument, it is immaterial whether the head of screw 5 is on the bottom of the instrument and the nut on top, or vice versa as shown. A circular indented area 6 may be incorporated around the center to shorten the necessary screw length.

A twelve-tone circular pitch instrument is identical in all respects to the one shown in FIG. 1 except that there are twelve evenly spaced openings and indicia instead of thirteen. Of course other numbers and progressions of musical tones may be laid out in a circular array, and other means for actuating the tones, e.g., electronic, may be applied to circular pitch instruments, to which non-illustrated embodiments of the present invention may be adapted.

Figure 2:
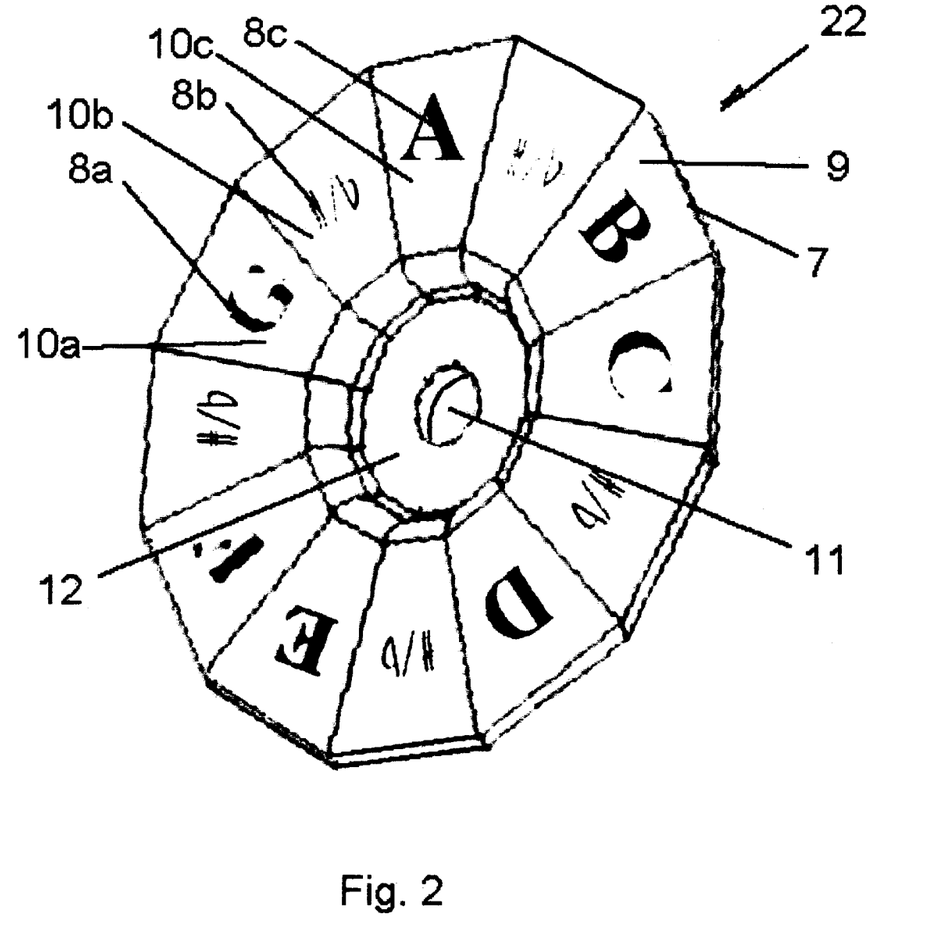
FIG. 2 is a perspective view of a twelve-indicium slide for use with either a twelve-tone or thirteen-tone circular pitch instrument.

FIG. 2 is a perspective view of a twelve-indicium slide 22, which the present invention comprises, for use with either a twelve- or thirteen-tone pitch instrument. It consists of a thin, approximately circular, piece of rigid material 7 marked with twelve indicia 8a, 8b, 8c etc. on its upper face 9. Each indicium is affixed to upper face 9 near the center of 30° wedge-shaped areas 10a, 10b, 10c etc. corresponding to the twelve tones of the chromatic scale from A to G in (for example) clockwise direction. A hole 11 located at the center is provided for mounting onto the center of the pitch instrument 21 of FIG. 1. A circular depression 12 is incorporated into the material 7 of the slide 22 to match the shape of the indented area 6 in face 3 of the pitch instrument 21 shown in FIG. 1. This indentation is illustrative of the fact that in order for the slide 22 to fit snugly and slide smoothly about a common axis of pitch instrument 21 against its face 3, the radial profile of the slide 22 must not interfere with that of the pitch instrument 21.

Figure 3:
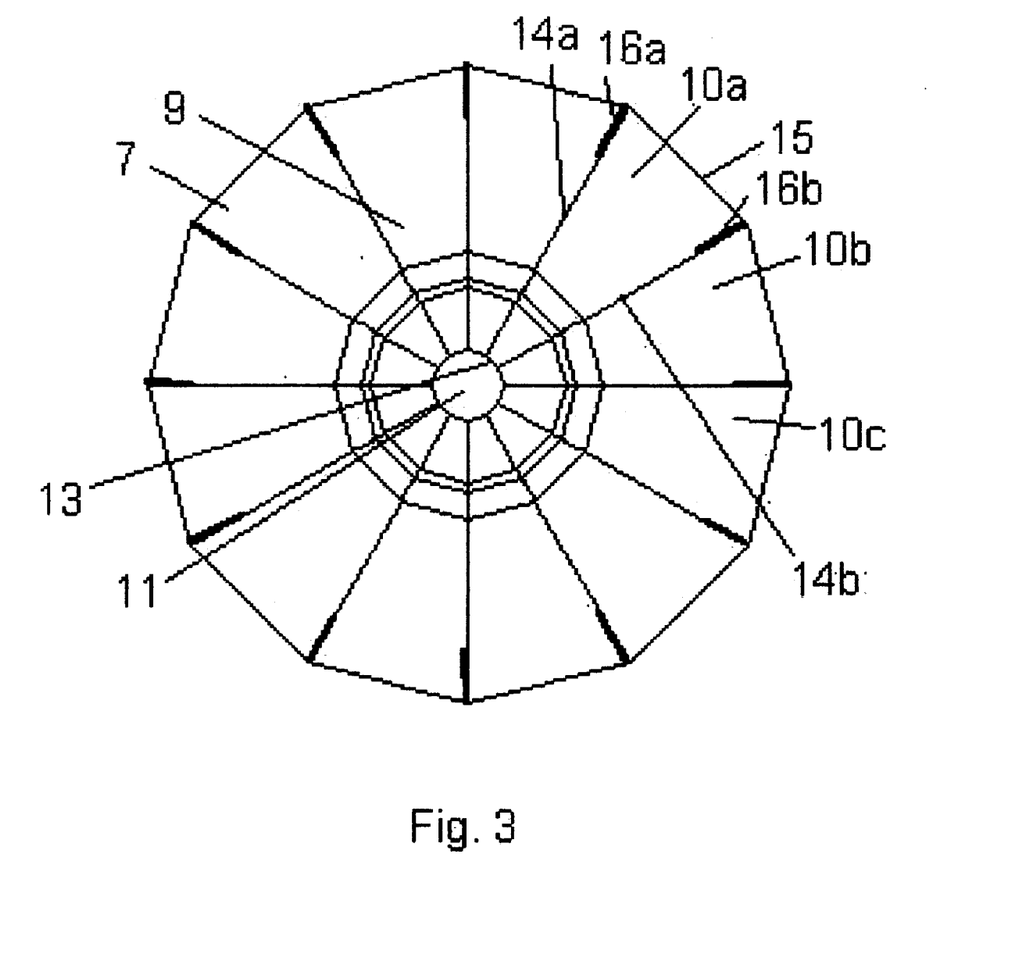
FIG. 3 is a top view of the slide of FIG. 2 (minus indicia).

FIG. 3 is a top view of the slide 22 (minus indicia) better showing the regular spacing of the twelve areas 10a, etc. Each area 10a etc. is bounded by a short inner edge 13 (making up a portion of the edge of hole 11), a first side 14a, a second side 14b, and an outer edge 15. Outer ends of sides 14 may be manifested as lines or ridges 16a and 16b on upper face 9 by printing or casting in material 7 to aid in positioning indicia 8a, etc. of FIG. 2 adjacent to indicia 4a, etc. of FIG. 1. Outer edge 15 may be arcuate, or straight (as shown) or other shape for ornamental purposes or to aid in tactile positioning of the slide.

Figure 4:
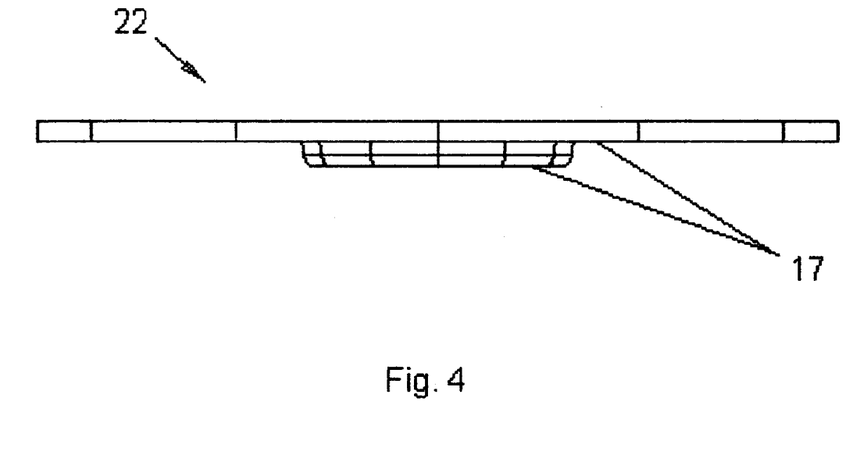
FIG. 4 is a side view of the slide of FIG. 2.

FIG. 4 is a side view of the slide 22 showing that its bottom profile 17 matches the shape of indented area 6 and face 3 of the pitch instrument 21 shown in FIG. 1.

Figure 5:
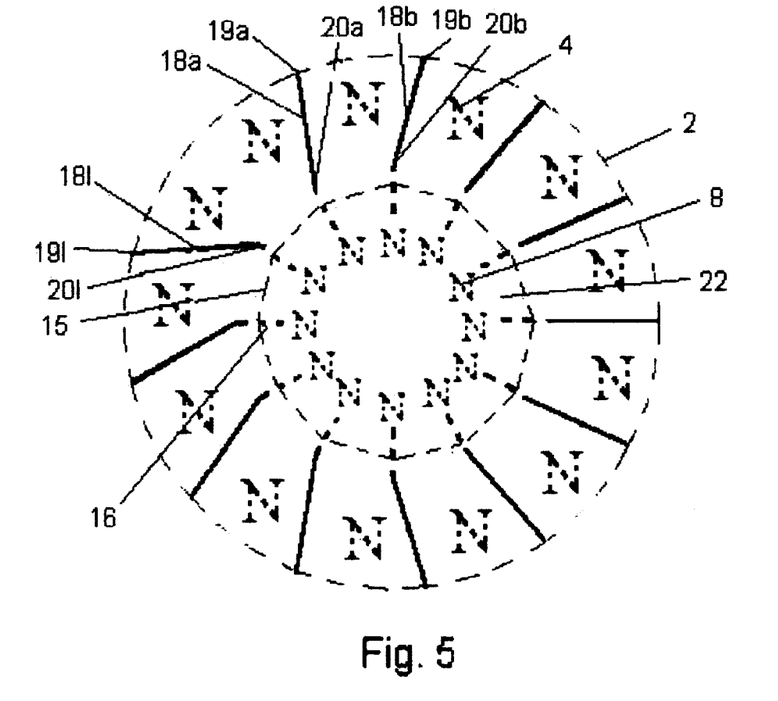
FIG. 5 is a top view of markings, in the preferred embodiment of the present invention, to be applied to the conventional thirteen-tone pitch instrument of FIG. 1 to enable it to cooperate with the slide of FIG. 2.

FIG. 5 is a top view of a novel set of markings 18a, 18b, . . . , 18l, which the preferred embodiment of the present invention comprises. Environmental structure and indicia are dotted lines in the figure, therefore everything shown besides the markings 18 is environmental structure. Outer musical note indicia 4 on the pitch instrument wheel 2 are indicated by large dotted letters "N". Inner musical note indicia 8 on the slide 22 are indicated by small dotted letters "IN". The inventive markings 18 are to be affixed to the face 3 of the pitch instrument 21 of FIG. 1. Wheel 2 of the pitch instrument 21 is indicated in FIG. 5 by a dotted circle. Outer edges 15 and ridges 16 on slide 22 of FIG. 2 are also shown (dotted) in register with markings 18. The markings 18 in this embodiment form boundaries between adjacent outer indicia 4. A principal feature of the invention is that the angular separation, measured at the center of wheel 2, between the outer ends 19a through 19l of markings 18 is approximately 27.7° ($\frac{1}{13}$ of a circle), except for the separation between ends 19l and 18a, which is twice that amount or approximately 55.3°. The inner ends 20a through 20l of markings 18 are separated by 30° ($\frac{1}{12}$ of a circle), measured at the center of wheel 2, so that they can register precisely opposite ridges 16 on the slide 22 of FIG. 2. Thus the transposition of musical note C, occupying two-thirteenths of wheel 2 of the pitch instrument 21 of FIG. 1 and lying between markings 18a and 18l, will cooperate with any one-twelfth area 10 of the slide 22.

Figure 6:
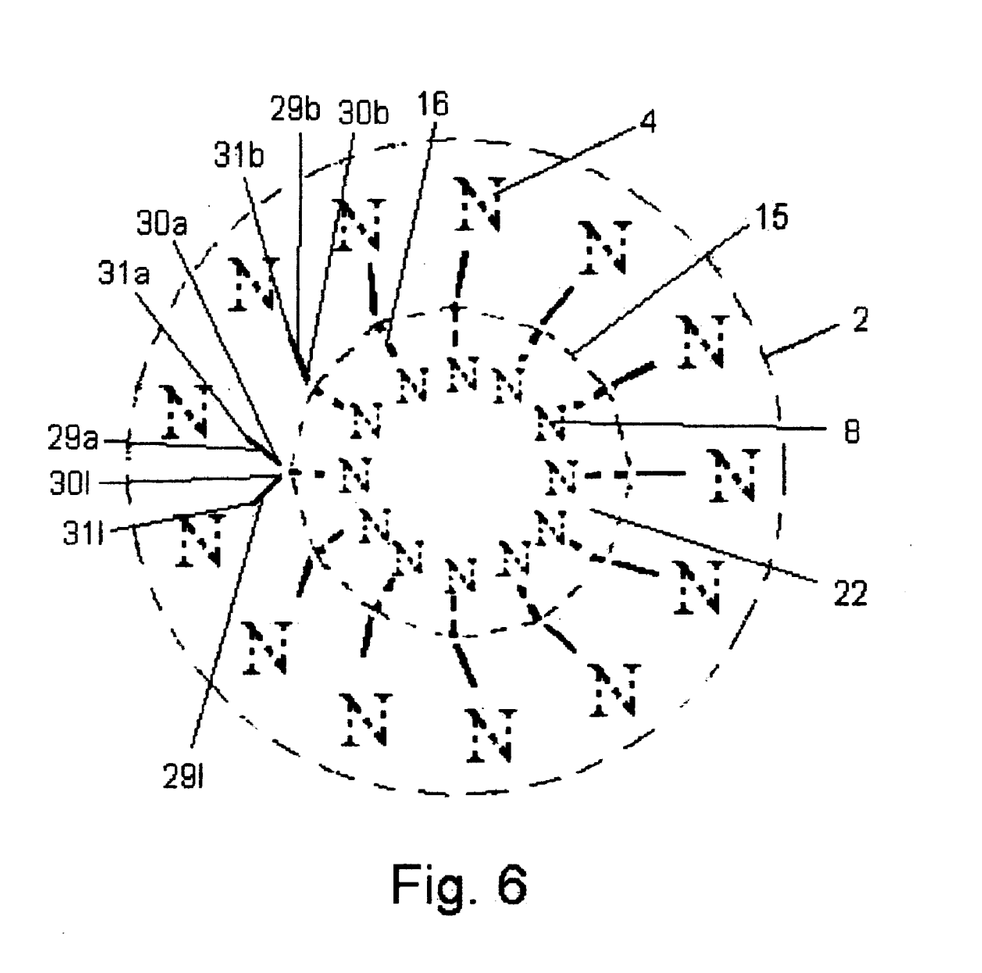
FIG. 6 is a top view of alternative markings, in a second embodiment of the present invention, to be applied to the conventional thirteen-tone pitch instrument of FIG. 1 to enable it to cooperate with the slide of FIG. 2.

FIG. 6 is a top view of an alternative novel set of markings 29a, 29b, . . . ,29l, which a second embodiment of the present invention comprises. Environmental structure and indicia are dotted lines in the figure; therefore everything shown besides the markings 29 is environmental structure. The inventive markings 29 are to be affixed to the face 3 of the pitch instrument 21 of FIG. 1. A principal feature of this second embodiment is that the markings 29 in this embodiment, unlike the markings 18 of the preferred embodiment of FIG. 5, point toward the centers of the outer indicia 4, rather than form boundaries between said indicia. The position of the outer ends 31a through 31l of markings 29 is a point radially just inside each corresponding outer indicium 4. Thus, the angular distance between outer end 31a and 31b, measured at the center of wheel 2, will be approximately 27.7° or $\frac{1}{13}$ of a circle. So too will be the angular separation of all the other markings 29 except between 31a and 31l, which will be separated by approximately 55.3°. The inner ends 30a through 30l of markings 29, however, are separated by 30° ($\frac{1}{12}$ of a circle) as measured at the center of wheel 2, so that they can register precisely opposite ridges 16 on the slide 22 of FIG. 2. Inner ends 30a and 30l must therefore coincide. Thus the transposition of musical note C, occupying two-thirteenths of wheel 2 of the pitch instrument 21 of FIG. 1 and lying radially just outside outer ends 31a and 31l, will cooperate with any ridge 16 of the slide 22.

Figure 7:
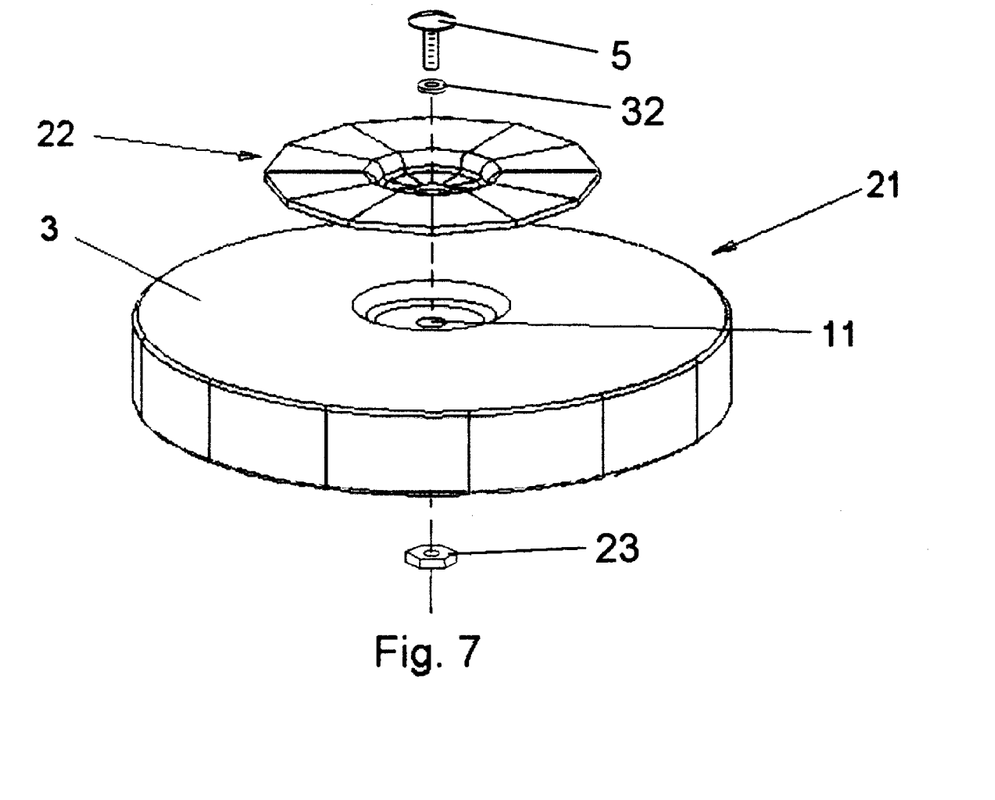
FIG. 7 is an exploded perspective view of the pitch instrument and slide showing the manner of assembly of the preferred embodiment.

FIG. 7 is an exploded perspective view of the pitch instrument and slide showing the manner of assembly of the present invention. Slide 22 is placed against face 3 of pitch instrument 21 and secured by means of screw 5 passing through washer 32 and hole 11 into nut 23.

Figure 8:
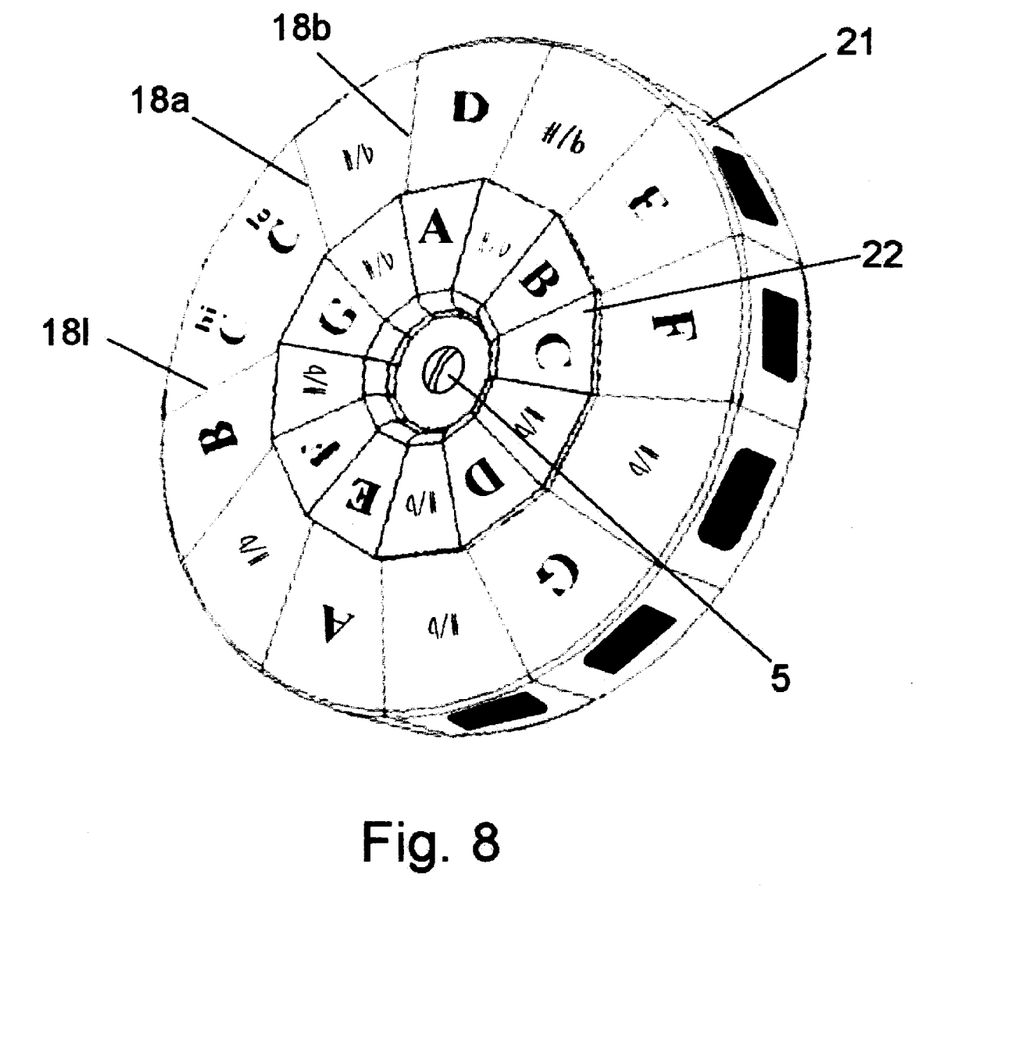
FIG. 8 is a perspective view of the slide of FIG. 2 mounted on the thirteen-tone pitch instrument of FIG. 1 with markings of FIG. 5 comprising the preferred embodiment of the invention.

FIG. 8 is a perspective view of the pitch instrument 21 of FIG. 1 equipped with the preferred embodiment of the present invention, that is, printed with markings 18a through 18l and assembled slidably and rotatably together with the slide 22 of FIG. 2 using screw 5.

Figure 9:
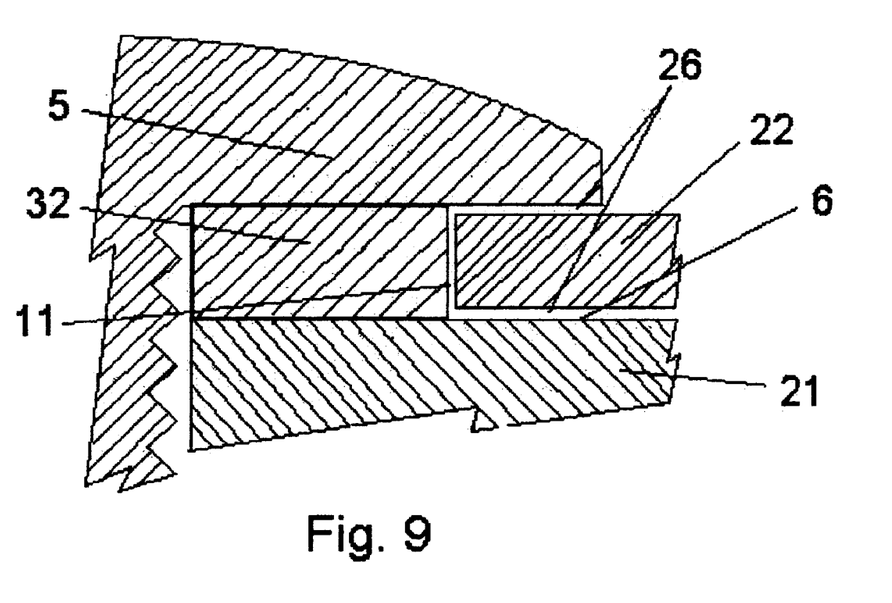
FIG. 9 is a cross-section of the screw head and surroundings joining the parts of FIG. 8 in slidable engagement.

FIG. 9 is an elevational cross-section of assembled screw 5, washer 32, hole 11 in slide 22, and indented area 6 on face 3 of pitch instrument 21. Note that to permit the slide 22 to rotate slidably coaxially about washer 32 relative to the pitch instrument 21, the thickness of washer 32 must be greater than slide 22 allowing space 26 above and below the washer 32, and the washer 32 must be smaller in diameter than hole 11 in slide 22 so that binding does not occur when screw 5 is fully tightened into nut 23 (not shown).

A third embodiment of the invention (not shown) is the use of slide 22 of FIG. 2 with a twelve-tone circular pitch instrument (not shown). In this embodiment, no additional markings as shown in FIGS. 5 and 6 are necessary to be applied to the face of the pitch instrument, because twelve indicia on a circular pitch instrument will cooperate with twelve indicia on the slide 22 of FIG. 2 in the absence of other markings.

I claim:

1. A transposing device, comprising:

A solid upper body (22) and a solid lower body (21);

the upper body having a periphery (7) and a center (11);

the upper body being rotatably affixed at its center with slight frictional engagement to the lower body;

the bottom surface (17) of the upper body and the top surface (3) of the lower body being of similar contour so as to permit smooth rotation of the upper body in contact with the lower body through any angle of rotation;

the upper face (9) of the upper body being marked with a number X of upper characters (8) to form an upper uniform circular array;

the lower body being marked with a number X+1 equally-spaced lower characters (4), at least two of which are identical and adjacent, and all of which form a lower uniform circular array;

the lower surface (3) being further marked by delineations ((18) in FIG. 5, (29) in FIG. 6) corresponding to, and capable of being rotatably aligned with, the upper characters, the delineations also having a one-to-one correspondence with X−1 of the lower characters and a one-to-two correspondence with the two adjacent remaining lower characters.

2. The transposing device of claim 1, wherein:

X=12;

said upper characters are the standard letter notations of the chromatic musical scale in any order; and said lower characters are the same notations in the same order with one character appearing twice side-by-side.

3. The transposing device of claim 2 wherein said lower body (21) comprises a radially-symmetrical arrangement of pitch producing instruments, each instrument, when played, producing the tone represented by the nearmost of said lower characters.

4. The transposing device of claim 3 wherein said pitch producing instruments consist of vibrating reeds with air inlet openings (1) at the periphery (2) of said lower body.

5. A musical key transposer, comprising:

a disk-shaped upper body (22) and a lower body (21) containing pitch-producing elements;

the upper body being approximately circular and having a periphery (7) and a center (11);

the upper body being rotatably affixed at its center with slight frictional engagement to the lower body;

The width of the upper body being less that the width of the lower body, exposing an annular surface portion of the top surface of the lower body;

the bottom surface (17) of the upper body and the top surface (3) of the lower body being flat and capable of smooth rotation relative to one another about the center through any angle of rotation;

the upper face (9) of the upper body being marked in even spacing near its periphery with the twelve musical notations of the chromatic scale in order of increasing pitch;

the annular surface of the lower body being marked with thirteen equally-spaced musical notations of the chromatic scale in the same order, two of which constitute a pair of identical and adjacent notations;

the annular surface of the lower body being further marked by lines connecting the eleven unpaired lower notations and the pair of identical notations with twelve evenly-spaced positions on the inner periphery of the annular surface, so that the twelve evenly-spaced notations on the upper body can be rotated into exact correspondence with any of the twelve possible sequences of the evenly-spaced positions on the annular surface of the lower body.

6. A musical key transposing attachment for a circular pitch instrument, the instrument comprising an upper face containing a first circular array of musical pitch notations, the attachment comprising:

a thin solid disk having a face formed to match the contour of the upper face of the pitch instrument;

the disk being of a diameter smaller than the first circular array;

the disk further having musical pitch notations arranged in a second circular array;

the disk further having, at its center, means of rotatable attachment to the pitch instrument;

the attachment means permitting the formed face of the attachment to slidably contact the upper side of the pitch instrument;

the second array cooperating visually with the first array, so that when the signature for a desired key on the second array is rotated to a position adjacent the signature of a given key on the first array, each of the notes in the scale of the desired key can be found on the second array adjacent to the corresponding note from the given key on the first array.

7. The musical key transposing attachment of claim 6, wherein said first array and said second array consist of an equal number of pitch notations.

8. The musical key transposing attachment of claim 7, wherein said number is twelve and said notations correspond to the twelve pitches of the chromatic musical scale in ascending order.

9. The musical key transposing attachment of claim 6 wherein:

said first circular array consists of the twelve pitches of the chromatic scale plus one pitch being a repeat of an adjacent pitch;

the first array being supplemented with alignment markings inwardly disposed toward said center from the first array, the alignment markings each defining a space between them, the spaces having an outer gap and an inner gap;

the outer gaps being spaced apart at twelve intervals, eleven of which subtend one-thirteenth of a circle, the twelfth of which is a wide gap subtending two-thirteenths of a circle;

the wide outer gap being centered on the pair of repeated adjacent pitches;

the inner gaps being twelve equal intervals each subtending one-twelfth of a circle;

the alignment markings having inner termini just outside said diameter of said disk; and said upper pitch notations thereby being positionable radially adjacent to said inner termini by manual rotation of said disk about said center.

\* \* \* \* \*